United States Patent [19]

Ishihara et al.

[11] Patent Number: 4,758,626

[45] Date of Patent: Jul. 19, 1988

[54] MELT OF AN AMORPHOUS AROMATIC POLYESTER WITH A MELT OF A CARBOXY TERMINATED POLYACRYLATE OLIGOMER

[75] Inventors: Toshio Ishihara, Evansville; Omar M. Boutni, Mt. Vernon, both of Ind.

[73] Assignee: General Electric Company, Mt. Vernon, Ind.

[21] Appl. No.: 48,845

[22] Filed: May 12, 1987

[51] Int. Cl.$^4$ .............................................. C08L 69/00
[52] U.S. Cl. .................................... 525/148; 525/168; 525/439; 525/445; 525/468

[58] Field of Search ............... 525/148, 221, 439, 445, 525/468, 168

[56] References Cited

U.S. PATENT DOCUMENTS 4,618,659 10/1986 Kania et al. .......................... 525/455

Primary Examiner—Theodore E. Pertilla
Attorney, Agent, or Firm—Martin B. Barancik

[57] ABSTRACT

A process which comprises mixing a melt of an amorphous aromatic polyester with a melt of a carboxy terminated polyacrylate oligomer, said oligomer having a number average molecular weight of from about 500 to about 10,000.

28 Claims, No Drawings

MELT OF AN AMORPHOUS AROMATIC POLYESTER WITH A MELT OF A CARBOXY TERMINATED POLYACRYLATE OLIGOMER

BACKGROUND OF THE INVENTION

Amorphous aromatic polyesters are well known in the polymeric art. They are generally characterized by the repeating unit carboxy ester

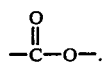

Aromatic polyesters are of particular importance and have many useful applications. Examples of aromatic amorphous polyesters for this invention include polycarbonates, copolyestercarbonates, polyarylates and polycycloalkylene phthalates.

Generally speaking aromatic polycarbonate resins offer a high resistance to the attack of mineral acids, may be easily molded, are physiologically harmless as well as strain resistant. It is also well known that polycarbonate resins have high impact strength below a critical thickness of between about ⅛ and ¼ inch. Additionally polycarbonates are transparent and process at relatively high temperatures with the appropriate melt viscosities.

Copolyestercarbonates are generally quite similar to polycarbonate in properties but generally have a higher secondary transition temperature (Tg) than the comparable polycarbonates. Polyarylates are generally quite similar to the copolyestercarbonates in properties but have a still higher secondary transition temperature than the copolyestercarbonates.

The uses and properties of the polycycloalkylene phthalates are well known. Common to all these amorphous aromatic polyesters are the rather high processing temperatures accompanied by the relatively high melt viscosities. This is part carbonates and polyarylates. Many processing aids have been introduced to lower the processing temperature and melt viscosities. However, all of them have met with some undesired effects. The acrylates have been used; however, the amorphous aromatic polyesters generally lose their transparency and oftentimes will also become embrittled as with the alkacrylates such as polymethylmethacrylates. Other properties which can be affected are the modulus and the gloss of a molded part.

It has now been discovered that the addition of a carboxy terminated polyacrylate oligomer lowers melt viscosity and essentially maintains to a significant extent a substantial number of its other properties such as impact resistance, modulus and transparency. Although the structure(s) of the composition is not known with certainty it is believed that ester interchange occurs to some extent between the carboxy terminated polyacrylate and the amorphous aromatic polyester thereby forming a new molecule. It is also believed that present in the new composition is an intimate admixture of the two components.

SUMMARY OF THE INVENTION

In accordance with the invention there is a process which comprises mixing a melt of an amorphous aromatic polyester with a melt of a carboxy terminated polyacrylate oligomer, said oligomer having a number average molecular weight of from about 500 to about 10,000.

A further aspect of the invention is compositions prepared from the above process.

Another aspect of the invention is a composition comprising an admixture of an amorphous aromatic polyester and a carboxy terminated polyacrylate oligomer having a number average molecular weight of from about 500 to about 10,000.

A still further aspect of the invention is a copolymer selected from the group consisting of

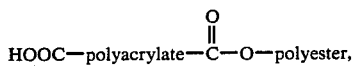

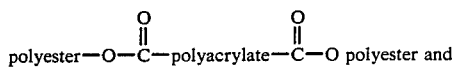

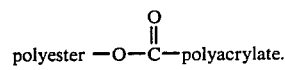

DETAILED DESCRIPTION OF THE INVENTION

The amorphous aromatic polyesters suitable for this invention include the polycarbonates, copolyestercarbonates, polyarylates and polycycloalkylene phthalates. The aromatic polycarbonate resins suitable for use herein as component (a) may be prepared by reacting a dihydric phenol with a carbonate precursor, such as phosgene, a haloformate or a carbonate ester. Typically, such carbonate polymers are represented as comprising recurring structural units of the formula:

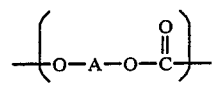

wherein A is a divalent aromatic radical of the dihydric phenol employed in the polymer producing reaction. Preferably, the carbonate polymers used to provide the resinous mixtures of the invention have an intrinsic viscosity (as measured in methylene chloride at 25° C.) ranging from about 0.30 to about 1.20 dl/g. The dihydric phenols which may be employed to provide such aromatic carbonate polymers are mononuclear or polynuclear aromatic compounds, containing as functional groups two hydroxy radicals, each of which is attached directly to a carbon atom of an aromatic nucleus. Typical dihydric phenols are:
2,2-bis-(4-hydroxyphenyl)propane;
hydroquinone;
resorcinol;
2,2-bis-(4-hydroxyphenyl)pentane;
biphenol
2,4'-(dihydroxydiphenyl)methane;
bis-(2-hydroxyphenyl)methane;
bis-(4-hydroxyphenyl)methane;
bis-(4-hydroxy-5-nitrophenyl)methane;
1,1-bis(4-hydroxyphenyl)ethane;
3,3-bis(4-hydroxyphenyl)pentane;
2,2-dihydroxydiphenyl;
2,6-dihydroxynaphthalene;
bis-(4-hydroxyphenyl)sulfone;
bis-(3,5-dimethyl-4-hydroxyphenyl)sulfone;
2,2-bis-(4-hydroxyphenyl)propane;
2,2-bis-(3,5-dimethyl-4-hydroxyphenyl)propane;

2,4'-dihydroxydiphenyl sulfone;
5'chloro-2,4'-dihydroxydiphenyl sulfone;
bis-(4-hydroxyphenyl)diphenyl sulfone;
4'4'-dihydroxydiphenyl ether;
4,4'-dihydroxy-3,3'-dichlorodiphenyl ether;
4,4'-dihydroxy-2,5-dihydroxydiphenyl ether; and the like.

Other dihydric phenols which are also suitable for use in the preparation of the above polycarbonates are disclosed in U.S. Pat. Nos. 2,999,835; 3,038,365; 3,334,154 and 4,131,575.

These aromatic polycarbonates can be manufactured by known processes, such as, for example and as mentioned above, by reacting a dihydric phenol with a carbonate precursor, such as phosgene, in accordance with methods set forth in the above-cited literature and U.S. Pat. No. 4,018,750 and 4,123,426, or by transesterification processes such as are disclosed in U.S. Pat. No. 3,153,008, as well as other processes known to those skilled in the art.

It is possible to employ two or more different dihydric phenols or a copolymer of a dihydric phenol with a glycol or with a hydroxy- or acid-terminated polyester or with a dibasic acid in the event a carbonate copolymer or interpolymer rather than a homopolymer is desired for use in the preparation of the polycarbonate mixtures of the invention. Branched polycarbonates are also useful, such as are described in U.S. Pat. No. 4,001,184. Also there can be utilized blends of a linear polycarbonate and a branched polycarbonate. Moreover, blends of any of the above materials may be employed in the practice of this invention to provide the aromatic polycarbonate. In any event, the preferred aromatic carbonate polymer for use as component (a) herein is a homopolymer derived from 2,2-bis(4-hydroxyphenyl)propane (bisphenol-A).

The aromatic copolyestercarbonates which can be employed in this invention include those aromatic polymers with ester and carbonate repeating units as those found in U.S. Pat Nos. 3,169,121; 4,287,787; 4,156,069; 4,260,731 and the like, each incorporated by reference. Of the aforementioned polymers, the polymers utilizing bisphenol-A as the dihydric phenol are preferred. Methods for preparing the polymers are well known and are described in the references cited above.

Polyarylates are polymers having all ester bonds. They are generally prepared from dihydric phenols and phthalic acids although any aromatic diacid or diphenol can be employed. These polymers and their methods of preparation are well known and are available commercially, for example under the tradename ARDEL from AMOCO. The dihydric phenol preferably employed is bisphenol-A and the aromatic diacid is terephthalic, isophthalic or a combination of the two.

The polycycloalkylene phthalates are typically the cis or trans 1,4-cyclohexane dimethanol based molecules wherein the diacids are terephthalic, isophthalic or a mixture thereof. Such polymers are available from Eastman Chemical under such tradenames as KODAR A150 (trans 1,4-cyclohexane dimethanol with 50:50 isophthalic and terephthalic acids as well as PCTG (1,4-cyclohexane dimethanol, terephthalic acid and ethylene glycol). Generally linear diols may be employed up to about 50 mole percent of the diol units or up until the point that the polymer still remains amorphous. Examples of such diols include diols of two to ten carbon atoms such as ethylene glycol, butane 1,4-diol and the like.

The polyacrylates employed are those oligomers wherein there is an acrylate or alkacrylate unit therein. The ester unit of the acrylate is in general an alkyl ester, the alkyl group being normal or branched, preferably normal and having one to six carbon atoms, inclusive. When the acrylate is an alkacrylate, the alk is alkyl, normal or branched, preferably normal, from one to six carbon atoms, inclusive. The polyacrylate need not be made up of all acrylate units but may be combined with monomers which can be combined into the oligomers by polymerization initiated by a radical transfer mechanism. Such monomers include acrylonitrile and styrene. Of course acrylate and alkacrylate monomers can be present in the same oligomer. Examples of polyacrylates include n-butylacrylate, ethylacrylate, methylmethacrylate, methylpropacrylate, isobutylmethacrylate, ethylacrylate styrene copolymer and methylmethacrylate acrylonitrile copolymer. When there is other than an acrylate monomer present in the oligomer, there is from about 10 to about 90 mole percent of the oligomer being the acrylate.

The polyacrylate oligomers are prepared by polymerization methods which also provide a carboxy end group. A preferred method of preparation is through a radical transfer mechanism. In this manner not only are the acrylates polymerized but the oligomeric chains are terminated with a carboxy group as well. The chain transfer agent employed in these preparations is a mercaptan having a terminal carboxylic acid or carboxylic anhydride group. Examples of such chain transfer agents include

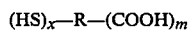

wherein x is 1 or 2, m is 1, 2 or 3 and R is alkylene of one to ten carbon atoms, inclusive, phenylene or mono or dialkyl substituted phenylene and

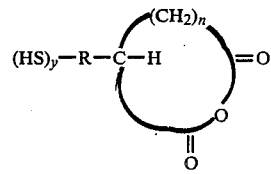

wherein y is 1 or 2, n is 0, 1, or 2 and R is as defined above. For the figures above preferably x and y are 1, m is 1 or 2, n is 1 or 2 and R is methylene or ethylene. Through the chain transfer reaction, the chain transfer agent becomes an endgroup and is referred to as the "carboxy" end group throughout the specification and claims because the carboxy terminates the polyacrylate oligomer chain and is capable of reaction. Preferred radical transfer agents are mercapto succinic acid, mercaptopropionate, thio lactic acid, thiobenzoic acid and thiosalicylic acid.

The carboxy terminated polyacrylate oligomer generally has a number average molecular weight of from about 500 to about 10,000, preferably from about 1,000 to about 8,000. Such oligomers are available commercially from Toagosei Chemical Industry Company Limited. The trademark material MDC-1M from Toagosei is a carboxy terminated polymethylmethacrylate. The polyacrylate is utilized in quantities sufficient to lower the melt viscosity of the composition. It is preferred to use a minimum of the polyacrylate so as to retain a substantial number of the physical properties of the amorphous aromatic polyester at or near their normal values. Examples of such physical properties include transparency, notched Izod impact resistance and various moduluses such as tensile and flexural. Generally no more than about 5 weight percent of the polyacrylate will accomplish the positive attributes of the invention while maintaining a substantial number of the physical properties at or near their normal values. When using a higher molecular weight polyester such as polycarbonate with an I.V. of greater than 1.0 dl/g at 25° C. methylene chloride and/or a higher molecular weight polyacrylate, 9,000–10,000, the composition can accept a higher weight percent of the polyacrylate.

The polyacrylate weight percent may be as much as fifteen or twenty weight percent of the polyacrylate and amorphous aromatic polyester if one does not wish to preserve the values of a substantial number of the physical properties. The minimum amount of polyacrylate necessary to reduce the melt viscosity can be employed. Generally about 0.5 to about 2.0 weight percent of polyacrylate is enough to observe a significant decrease in melt viscosity.

As previously mentioned, the carboxy terminated polyacrylate is mixed with the amorphous aromatic polyester generally under dry blend conditions and then coextruded together to form the admixture and new copolymer. Extrusion temperatures employed are those which render the composition thermoplastic. Molding conditions to form a shaped article are those sufficient to make thermoplastic the composition for purposes of shaping in the mold, for example molding temperatures of 500°–570° F. will most likely be satisfactory.

The instant compositions may also optionally contain certain commonly known and used additives such as, for example, flame retardants, antioxidants-antistatic agents, fillers such as glass fibers, glass beads, talc, mica, clay, and the like; mold release agents; ultraviolet radiation absorbers such as the benzophenones, benzotriazoles, benzylidene malonates, and the like; color stabilizers such as the organophosphites disclosed in U.S. Pat. Nos. 3,305,520 and 4,118,370, both of which are hereby incorporated by reference; and the like.

Interestingly when fillers such as glass fiber or carbon black powder are in the instant compositions, not only are the melt viscosities lowered while retaining the other values for certain of the physical properties but the surface gloss of the molded article is significantly increased.

The following examples are presented to more fully and clearly illustrate the invention. Although the examples set forth the best mode presently known to practice the invention they are intended to be and should be considered as illustrative rather than limiting the invention. In the examples, all parts and percentages are by weight unless otherwise specified.

EXAMPLES

In the experiments below various grades of LEXAN ® polycarbonate resin were used based upon bisphenol-A Only the intrinsic viscosities (I.V.) differed. 145 has an I.V. of 0.49–0.52. 105 has an I.V. of 0.53–0.55. 135 has an I.V. of 0.56–0.58. The "PMMA" employed was carboxy terminated polymethylmethacrylate oligomer with $M_n = 1500$, $M_w/M_n = 1.6$ obtained from Toagosei Chemical Ind. Co. Ltd. as MDC-1M. "GA" is chopped glass fiber, OCF 418AA, obtained from OwensCorning. The Tensile St (Y) is Tensile Strength of a molded article as measured and reported according to ASTM D638.

K.I., the Kasha Index, is a measure of melt viscosity and is defined in U.S. Pat. No. 4,465,820, herein incorporated by reference. The "Gloss 60°" is the surface gloss of a molded article measured at 60° with a Gardner Glossmeter. "%T" is the percent transmission of light measured in acordance with ASTM D1003. "% Haze" is the haze in a molded plaque as measured by ASTM D1003.

TABLE I

| EXAMPLE | −1 | −2 | −3 | −4 | −5 | −6 | −7 | −8 | −9 | −10 | −11 | −12 |
|---|---|---|---|---|---|---|---|---|---|---|---|---|
| LEXAN ® resin | | | | | | | | | | | | |
| 135 | 100 | 97.5 | — | — | — | — | — | — | — | — | — | — |
| 105 | — | — | 100 | 97.5 | 95 | — | — | — | — | — | — | — |
| 145 | — | — | — | — | — | 100 | 98.25 | 97.5 | 95 | 93 | 90 | 88.1 |
| PMMA | — | 2.5 | — | 2.5 | 5 | — | 1.75 | 2.5 | — | 2 | — | 1.9 |
| GA | — | — | — | — | — | — | — | — | 5 | 5 | 10 | 10 |
| Carbon black | — | — | — | — | — | — | — | — | 1.0 | 1.0 | 1.0 | 1.0 |
| Tens. St(Y)psi | 9100 | 9800 | 9100 | 9700 | 10200 | 9200 | 9500 | 9700 | 10200 | 10500 | 10700 | 10600 |
| KI (6 min) | 11500 | 2900 | 5200 | 3100 | 2000 | 3500 | 3200 | 2400 | 5300 | 3300 | 7300 | 4800 |
| Gloss (60°) | — | — | — | — | — | — | — | — | 42 | 59 | 29 | 33 |
| % T | — | — | 91.0 | 91.0 | 90.5 | — | — | — | — | — | — | — |
| % Haze | — | — | 0.2 | 0.3 | 0.9 | — | — | — | — | — | — | — |

The results in the Table demonstrate the value of the carboxy terminated polyacrylate present with the amorphous aromatic polyester. Example 2 shows the very large drop in melt viscosity occurring when as little as 2.5 weight percent carboxy terminated PMMA is added to the polycarbonate. Additionally the tensile strength has risen significantly as well. Examples 4 and 5 show the same positive results occurring when using, respectively 2.5 and 5 weight percent carboxy terminated PMMA with a lower I.V. polycarbonate. The data also demonstrate that %T and % haze are unchanged with the smaller amounts of carboxy terminated PMMA and are affected only somewhat with the larger quantity of carboxy terminated PMMA. Examples 7 and 8 demonstrate the same results as Examples 2 and 3 but with an even lower I.V. polycarbonate. Examples 10 and 12 show the reduction in melt viscosity and, additionally, increase in surface gloss of the molded part when carboxy terminated PMMA is present in the composition together with glass fibers in comparison to Examples 9 and 11 wherein only the glass fibers are present in the composition.

In the Examples below, the polyacrylate (PA) is a polybutylacrylate of number average molecular weight of about 5,000 obtained from Toagosei as MDC-5B. The notched Izod (N.I.) test system is ASTM D260.

TABLE II

| EXAMPLE | 13 | 14 | 15 | 16 |
|---|---|---|---|---|
| LEXAN ® RESIN 105 | 100 | 99 | 98 | 95 |
| POLYACRYLATE | — | 1 | 2 | 5 |
| ⅛" N.I. | 17.7 | 17.6 | 17.5 | 14.8 |
| ¼" N.I. | 2.7 | 3.7 | 10.2 | 10.4 |
| KI (6 min) | 5330 | 4990 | 4800 | 1740 |

In the samples having PA, all of the molded plaques were opaque. In order to obtain transparency, it is preferred to have the ester portion of the polyacrylate be methyl or ethyl.

What is claimed is:

1. A process which comprises mixing a melt of an amorphous aromatic polyester with a melt of a carboxy terminated polyacrylate oligomer, said oligomer having a number average molecular weight of from about 500 to about 10,000.

2. The process in accordance with claim 1 wherein the amorphous aromatic polyester is polycarbonate, copolyestercarbonate, polyarylate or polycycloalkylene phthalate.

3. The process in accordance with claim 2 wherein the polyester is a polycarbonate.

4. The process in accordance with claim 3 wherein the polycarbonate is bisphenol-A polycarbonate.

5. The process in accordance with claim 2 wherein the polyacrylate is a polymethylmethacrylate.

6. The process in accordance with claim 4 wherein the polyacrylate is a polymethylmethacrylate.

7. The process in accordance with claim 2 wherein the polyacrylate is from about 0.5 to about 20 weight percent of the polyester and polyacrylate.

8. The composition prepared from the process of claim 1.

9. The composition in accordance with claim 8 wherein the polyester is polycarbonate.

10. The composition in accordance with claim 9 wherein the polyacrylate is polymethylacrylate.

11. The composition in accordance with claim 10 wherein the polymethylmethacrylate is from about 0.5 to 20 weight percent of the polycarbonate and polymethylmethacrylate.

12. A composition comprising an admixture of an amorphous aromatic polyester and a carboxy terminated polyacrylate oligomer having a number average molecular weight of from about 500 to about 10,000.

13. The composition in accordance with claim 11 wherein the polyester is polycarbonate.

14. The composition in accordance with claim 12 wherein the polycarbonate is bisphenol-A polycarbonate.

15. The composition in accordance with claim 12 wherein the polyacrylate is a polymethylmethacrylate.

16. The composition in accordance with claim 14 wherein the polyacrylate is a polymethylmethacrylate.

17. The composition in accordance with claim 12 wherein the polyacrylate is from about 0.5 to about 20 weight percent of the polyester and polyacrylate.

18. A composition comprising at least-one copolymer selected from the group consisting of

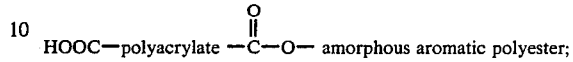

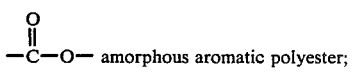

19. The composition in accordance with claim 18 wherein the polyester is polycarbonate, copolyestercarbonate, polyarylate or polycycloalkylene phthalate.

20. The composition in accordance with claim 19 wherein the polyester is polycarbonate.

21. The composition in accordance with claim 20 wherein the polycarbonate is bisphenol-A polycarbonate.

22. The composition in accordance with claim 19 wherein the polyacrylate is polymethylmethacrylate.

23. The composition in accordance with claim 21 wherein the polyacrylate is polymethylmethacrylate.

24. The composition in accordance with claim 18 wherein the copolymer is

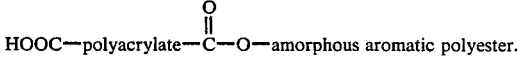

25. The composition in accordance with claim 18 wherein the copolymer is

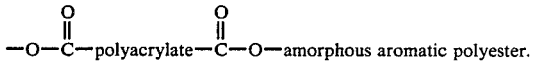

26. The composition in accordance with claim 18 wherein the copolymer is

27. The composition of claim 8 wherein a filler is present.

28. The composition of claim 9 wherein a filler is present.

* * * * *